(12) United States Patent
Krahn

(10) Patent No.: US 7,532,615 B2
(45) Date of Patent: May 12, 2009

(54) UNIVERSAL AGENT LOG-IN USING A SIP REGISTRAR

(76) Inventor: Kirk Krahn, 38W950 McNair Dr., Geneva, IL (US) 60134

( * ) Notice: Subject to any disclaimer, the term of this patent is extended or adjusted under 35 U.S.C. 154(b) by 1031 days.

(21) Appl. No.: 10/900,223

(22) Filed: Jul. 27, 2004

(65) Prior Publication Data

US 2006/0023864 A1 Feb. 2, 2006

(51) Int. Cl.
*H04L 12/66* (2006.01)
*H04M 3/00* (2006.01)
*H04M 5/00* (2006.01)

(52) U.S. Cl. .............. 370/352; 379/265.04; 379/265.02

(58) Field of Classification Search ............ 379/265.02, 379/265.04, 266.01; 370/352
See application file for complete search history.

(56) References Cited

U.S. PATENT DOCUMENTS

| | | | |
|---|---|---|---|
| 5,555,179 A | 9/1996 | Koyama et al. | |
| 5,765,033 A | 6/1998 | Miloslavsky | |
| 5,926,539 A | 7/1999 | Shtivelman | |
| 5,946,387 A | 8/1999 | Miloslavsky | |
| 5,953,332 A | 9/1999 | Miloslavsky | |
| 5,953,405 A | 9/1999 | Miloslavsky | |
| 6,002,760 A | 12/1999 | Gisby | |
| 6,021,428 A | 2/2000 | Miloslavsky | |
| 6,044,145 A | 3/2000 | Kelly et al. | |
| 6,044,368 A | 3/2000 | Powers | |
| 6,067,357 A | 5/2000 | Kishinsky et al. | |
| 6,108,711 A | 8/2000 | Beck et al. | |
| 6,122,364 A * | 9/2000 | Petrunka et al. ........ | 379/265.02 |
| 6,138,139 A | 10/2000 | Beck et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,185,292 B1 | 2/2001 | Miloslavsky | |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,594,357 B1 * | 7/2003 | Emerson et al. ........ | 379/265.04 |
| 6,732,156 B2 | 5/2004 | Miloslavsky | |
| 6,947,724 B2 * | 9/2005 | Chaney ...................... | 455/408 |
| 7,206,388 B2 * | 4/2007 | Diacakis .................. | 379/88.03 |
| 7,315,616 B2 * | 1/2008 | Annadata et al. ........ | 379/266.01 |
| 2002/0095584 A1 | 7/2002 | Royer et al. | |
| 2003/0018702 A1 | 1/2003 | Broughton et al. | |
| 2003/0169730 A1 | 9/2003 | Narasimhan et al. | |
| 2003/0224781 A1 | 12/2003 | Milford et al. | |
| 2004/0028212 A1 | 2/2004 | Lok et al. | |
| 2004/0131163 A1* | 7/2004 | Burger ...................... | 379/88.17 |
| 2005/0135335 A1* | 6/2005 | Hession et al. ............... | 370/352 |

* cited by examiner

*Primary Examiner*—Ahmad F Matar
*Assistant Examiner*—Sonia Gay

(57) ABSTRACT

A method and apparatus are provided for registering an agent of an automatic contact distribution system for receiving calls. The method includes the steps of providing a file containing a file identifier and a plurality of contact addresses within a registration server where each contact address identifies a communication port through which the agent may be contacted under a respective communication protocol, the presence server receiving a SIP REGISTRATION message from the agent where the SIP REGISTRATION message contains the identifier of the file, but not the file itself and the registration server simultaneously registering the agent with the plurality of contact addresses under each of the respective communication protocols in response to the SIP REGISTRATION message.

42 Claims, 1 Drawing Sheet

UNIVERSAL AGENT LOG-IN USING A SIP REGISTRAR

FIELD OF THE INVENTION

The field of the invention relates to computer systems and more particularly, to automatic call distributors.

BACKGROUND OF THE INVENTION

Automatic call distributors (ACDS) are known. Such systems are typically used by organizations to serve large numbers of callers through the Public Switched Telephone Network (PSTN). Typically, inbound calls are directed to a common telephone number of the organization and distributed to agents based upon some criteria (e.g., agent idle time).

In addition to handling inbound calls, ACDs may also process outbound calls. Typically, a controller monitors a workload of its agents. Where a workload of received calls falls below some threshold value, the controller may begin to initiate outbound calls.

In addition to placing and distributing calls, an ACD may also identify and display documents on agent terminals as an aid to processing the calls. In the case of incoming calls, the calls may be received along with dialed number identification service (DNIS) and/or automatic number identification (ANI) information. ANI may be used to identify a caller at the same instant as the call is delivered to the ACD. The controller of the ACD may use the ANI information to retrieve and display customer records on a terminal of the agent selected to handle the call at the same instant that the call is delivered to the agent.

In addition, textual information may be displayed on a terminal of the agent that guides the agent through a sales presentation. DNIS information may be used to identify an intended call target and to select an appropriate sales presentation for use by the agent based upon the intended call target.

While automatic call distributors work relatively well, they are not particularly well suited to handling Internet calls. The standards that are used for processing switched circuit calls through the PSTN cannot be used within the Internet. For example, calls distributed through a conventional switched circuit system are typically processed under a single format while contacts processed through the Internet are often distributed under a number of different formats (e.g., VoIP, e-mail, IM etc.). In addition, while a caller under a switched circuit format may simply pick up a telephone and dial a number, a caller over the Internet must first log into an appropriate server in order to exchange messages. The need to log into an appropriate server is time consuming and wasteful. Accordingly, a need exists for a method of exchanging messages over the Internet that is less complex does not require logging into multiple servers.

SUMMARY

A method and apparatus are provided for registering an agent of an automatic contact distribution system for receiving calls. The method includes the steps of providing a file containing a file identifier and a plurality of contact addresses within a registration server where each contact address identifies a communication port through which the agent may be contacted under a respective communication protocol, the presence server receiving a SIP REGISTRATION message from the agent where the SIP REGISTRATION message contains the identifier of the file, but not the file itself and the registration server simultaneously registering the agent with the plurality of contact addresses under each of the respective communication protocols in response to the SIP REGISTRATION message.

DETAILED DESCRIPTION OF AN ILLUSTRATED EMBODIMENT

Figure 1:
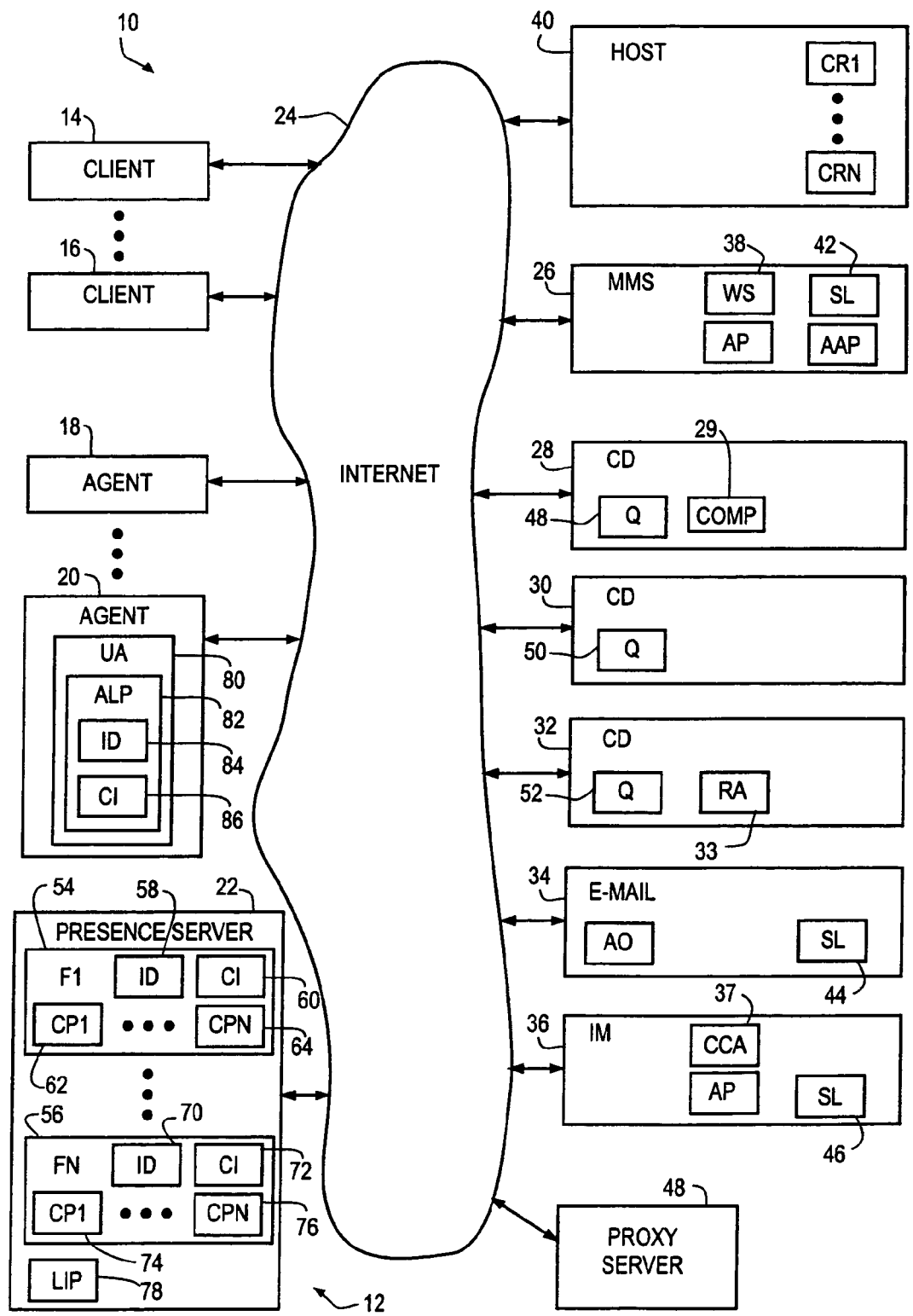
FIG. 1 is a block diagram of a contact distribution system in accordance with an illustrated embodiment of the invention.

FIG. 1 is a block diagram of a contact distribution system 10 shown under an illustrated embodiment of the invention. The contact distribution system may be used for connecting calls through the Internet 24 between clients 14, 16 and agents 18, 20. In general, the system 10 may be used by any of a number of different enterprise organizations (e.g., commercial, environmental, political, etc.) to advance the agenda of the enterprise.

The system 10 may include a number of computer resources 18, 20, 26, 28, 30, 32, 34, 36 that function to form the connections between clients and agents. Shown in FIG. 1 is a user access system 12 that allows agents 18, 20 to automatically log onto the resources 18, 20, 26, 28, 30, 32, 34, 36 of the system.

As used herein, a computer resource of the organization is a computer application or processor that processes information that is directly related to enterprise operations of the organization. Using the Open Systems Interconnection (OSI) network model, a computer resource is a user application that operates from Layer 7 of the OSI model.

As described below, at least some of the computer resources 18, 20, 26, 28, 30, 32, 34, 36 perform predetermined services for other computer resources in furtherance of enterprise objectives. As used herein, a predetermined service performed by one resource for another means the processing of data to achieve some enterprise result that is not directly related to communication connections through the Internet.

Access to the contact center 10 of the organization by clients 14, 16 of the organization may be provided through the Internet 24 under any of a number of different processes. In order to promulgate the agenda of the organization to its clients 14, 16, the organization may publish contact information (e.g., e-mail addresses, instant message (IM) addresses or universal resource locators (URLs)), by advertising or otherwise, that identifies a communication path to the organization.

Under the illustrated embodiment, the contact distribution system 10 may include one or more servers 26, 34, 36 that may function to receive and initially process calls. A first server 34 may receive calls in the form of e-mails. A second server 36 may receive calls under an Instant Messaging (IM) format. A third multi-mode server 26 may receive calls from one or more webpages downloaded to clients 14, 16 from a website 38 of the multi-mode server 26.

In the case where the organization is a manufacturer with many different products, a different e-mail address may be provided for each different product line. As such, the e-mail server 34 may receive e-mails directed to many different addresses that are all within one or more domain names used by the e-mail server 34. The use of different destination addresses may be used to provide the system 10 with a first level indication of the call type of the received call. The IM server 36 and multi-mode server 26 may be used in a similar manner.

Calls processed by the servers 26, 34, 36 may be initiated in any of a number of different ways. For example, a call from a client 14, 16 to the multi-mode server 26 may be initiated by activation of a SPEAK WITH AGENT softkey on a webpage downloaded from the multi-mode server 26. Alternatively, calls from clients 14, 16 may by initiated in response to pop-up ads posted to websites visited by clients 14, 16. Calls may also be initiated conventionally by a client 14, 16 activating an appropriate application (e.g., Outlook by Microsoft) and entering a Universal Resource Locator (URL) of the organization under an e-mail or IM format in response to a printed ad in a newspaper or magazine.

Calls from clients 14, 16, received by the servers 26, 34, 36 may be distributed to agents 18, 20 through a number of call distributors 28, 30, 32. As the calls arrive, the server 26, 34, 36 receiving the call may open a file for each call that is, in turn, identified by a unique call identifier. The file may include at least a source identifier (e.g., an e-mail address, URL, etc.) of the client 14, 16 originating the call and a destination identifier that identifies the call destination (e.g., e-mail address, URL, etc.) within the system 10. In the case of calls received by the multi-mode server 26, information regarding any webpages visited may also be included within the call file.

A copy of each call file may be transferred to the host 40. Within the host 40, the information within the call file may be used to identify further information about the caller. For example, the source identifier may be used to classify the call as originating from existing or new customers. Information on webpages visited or on prior contacts with the client 14, 16 may be used to provide and locate information regarding the type of call involved.

Any additional information regarding the call may be transferred back to the server 26, 34, 36. Within the server 26, 34, 36, the information within the call file and, possibly, any additional information from the host 26 may be used within a call classification application 37 to further classify the call into one or more call types.

Once a call type has been determined, the server 26, 34, 36 may transfer the call to a call distributor 28, 30, 32. The call distributor 28, 30, 32 that the server 26, 34, 36 selects to handle the call may be based upon availability or upon the call type.

Selection of a contact distributor 28, 30, 32 may be based simply upon status or upon some predetermined criteria. For example, the first call distributor 28 may be associated with agents 18, 20 who are primarily skilled at handling calls of a first call type and who have secondary skills in handling calls of a second type and third call type. Similarly, the second call distributor 30 may be associated with agents 18, 20 who are primarily skilled at handling calls of a second call type and who have secondary skills in handling calls of a first type and third call type and the third call distributor 32 may be associated with agents 18, 20 who are primarily skilled at handling calls of a third call type and have secondary skills in handling calls of a first type and second call type.

As such, calls of the first call type will normally be transferred to the first call distributor 28, calls of the second call type will be transferred to the second call distributor 30 and calls of the third call type will be transferred to the third call distributor 32. However, if one or more of the call distributors 28, 30, 32 is inoperative or otherwise unavailable or is overloaded, then calls may be handled by any other call distributor 28, 30, 32.

If the primary call distributor 28, 30, 32 is available, then the server 26, 34, 36 may transfer the call along with the file to the appropriate server 28, 30, 32. Within the call distributor 28, 30, 32, a call routing application 33 may compare the contents of the call file with a list of agent skills and may assign the call to a qualified agent 18, 20. If an agent is not available, then the agent selection processor may place the call in a call queue 48, 50, 52 pending availability of a qualified agent.

In either case, once a qualified agent 18, 20 becomes available the call distributor 28, 30, 32 may transfer the call to the agent. The agent 18, 20 may handle the call in a conventional manner.

The list of agents and agent skills within the call distributors 28, 30, 32 may be obtained from the host 40 based upon the identity of the logged-in agents 18, 20. Agents 18, 20 may log into the system 10 through use of the presence server 22 (as defined by the Internet Engineering Task Force (IETF) RFC #3261).

Turning now to the user access system 12, an explanation will be provided of the method steps used by the apparatus 12 to automatically log agents 18, 20 into the system 10. Under illustrated embodiments of the invention, the presence server 22 may contain one or more log-in lists 54, 56 for each agent 18, 20. The log-in lists 54, 56 may be used by the presence server 22 to automatically log-in each agent 18, 20 upon activation of the agent's terminal 18, 20 and entry by the agent of the agent's name and personal identification number (PIN).

Each log-in list 54, 56 may contain a number of contact addresses 62, 64, 74, 76 where each contact address identifies a communication port through which the agent may be contacted under a respective communication format (e.g., VoIP, e-mail, IM, cellphone, etc.). The contact addresses may have the form as follows.

---

Contact: <sip:AgentA@5,4,2,1>; class=personal;
   expires=3600
Contact: <sip:AgentA-mesg-deposit@voicemail. provider.
   com>; feature=voicemail; expires=3600
Contact: <sip: +3125551212@gateway.com; user=phone>;
   class=business; expires=3600
Contact: <sip: +3125553333@cellphone.com>;
   mobility=mobile; expires=3600
Contact: <mailto:Agent@home.com>

---

The log-in lists 54, 56 may also contain a file identifier (e.g., a name of the agent and/or a PIN of the agent. The file identifier may also include a context identifier 60, 72. The context identifier 60, 72 may be used in the case of an agent who has a number of different log-in lists 54, 56 to identify a different log-in file 54, 56 for each context in which the agent finds himself. For example, a first context identifier 60, 72 may be used when the agent 18, 20 is in his office and has access to the most communication channels (e.g., VoIP, e-mail, IM, telephone, LAN, etc.). A second context identifier 60, 72 may be used when the agent is at home and has access through a fewer number of channels and different channels (e.g., a home phone versus an office phone). A third context identifier 60, 72 may be used when the agent 18, 20 is traveling and has access through another set of communication channels (e.g., cellphone, e-mail through a PDA, etc.).

In order to access the communication channels in context, an automatic log-in application 82 operating from within a user agent 80 may compose and send a Session Initiation Protocol (SIP) REGISTER message (as defined by IETF RFC #3261) to the presence server 22. The SIP REGISTER message composed and sent by the log-in application 82 may have the form as follows.

```
REGISTER sip: registrar@callcenter.com SIP/2.0
From: Agentstn@callcenter.com
Contact: agent=John.Smith
Contact: Pin=1234
Contact-Length=0.
```

In this example, the "From" field may identify the agent station "Agentstn@callcenter.com" where the agent is working. The first contact header "agent=John.Smith" may be used to provide the identity of the agent and the second header "Pin=1234" may be used to provide the PIN number to the presence server 22. An optional third contact header (e.g., "class=personal", "class=business", etc.) may also be included as a context identifier within the SIP REGISTER message.

The identification of the agent station is provided to allow the communication ports to be linked to the proper terminal. The agent name and PIN (and in some cases a context identifier) are provided to allow the presence server to identify the proper file 54, 56 in the case where an agent has a number of log-in files 54, 56.

Upon receipt of the SIP REGISTER message from the agent 18, 20 by the presence server 22, a log-in processor 78 may decode the SIP REGISTER message and begin to search for a file 54, 56 using the agent identifier and PIN (and possibly the context identifier) from the SIP REGISTER message. Where the log-in processor 78 finds a file where the agent identifier and PIN (and possibly the context identifier) of the file matches the contents of the SIP REGISTER message, then the log-in processor 78 may log the agent 18, 20 into the respective communication channels contained in the matched file 54, 56.

In this regard, a registrar of the presence server 22 may update the agent's record in the location (proxy) server 48. Alternatively, or in addition, the presence server 22 may transfer the contact addresses to a respective contact distributor 28, 30, 32 for purposes of registering the agent 18, 20 as being logged-into the system 10. In this regard, the presence server 22 may transfer an e-mail contact address to an e-mail contact distributor 28, 30, 32, an instant messaging contact address to an instant messaging contact distributor 28, 30, 32, etc.

A specific embodiment of method and apparatus for registering an agent with a contact distribution system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of registering an agent of an automatic contact distribution system for receiving calls, such method comprising the steps of:
   providing a file containing a file identifier and a plurality of contact addresses within a Session Initiation Protocol (SIP) presence server where each contact address identifies a communication port through which the agent may be contacted under a respective communication protocol;
   the presence server receiving a SIP REGISTRATION message from the agent where the SIP REGISTRATION message contains the identifier of the file, but not the file itself; and
   the presence server simultaneously logging the agent into each communication port identified by each of the plurality of contact addresses under each of the respective communication protocols in response to the SIP REGISTRATION message.

2. The method of registering the agent as in claim 1 wherein a contact address of the plurality of contact addresses further comprises an e-mail address.

3. The method of registering the agent as in claim 1 wherein a contact address of the plurality of contact addresses further comprises an instant messaging address.

4. The method of registering the agent as in claim 1 wherein a registrar of the presence server updates an agent records in a location server and transfers the contact addresses to a contact distributor of the contact distribution system to register the agent as logged-in to the system.

5. The method of registering the agent as in claim 1 wherein a contact address of the plurality of contact addresses further comprises a cellphone number.

6. The method of registering the agent as in claim 1 further comprising automatically generating the SIP REGISTRATION message upon activation of a terminal of the agent and entry of the agent's name and personal identification number.

7. The method of registering the agent as in claim 6 further comprising encoding a personal identification number into the automatically generated SIP REGISTER message.

8. The method of registering the agent as in claim 6 further comprising encoding a context identifier into the automatically generated SIP REGISTER message which identifies as context of the agent and any communications channels the agent has access to within the context.

9. The method of registering the agent as in claim 8 wherein the context identifier further comprises an indication that the agent is traveling.

10. The method of registering the agent as in claim 8 wherein the context identifier further comprises an indication that the agent is at work.

11. The method of registering the agent as in claim 8 wherein the context identifier further comprises an indication that the agent is at home.

12. The method of registering the agent as in claim 11 wherein the file further comprises a plurality of files.

13. The method of registering the agent as in claim 12 wherein each file of the plurality of files further comprises a plurality of contact addresses where each contact address identifies a communication port through which the agent may be contacted under a respective communication protocol.

14. The method of registering the agent as in claim 13 further comprising matching the personal identification number of the agent with indicia of identity within each file of the plurality of files and registering the agent's presence at each of the plurality of contact addresses of any matched file.

15. An apparatus for registering an agent of an automatic contact distribution system for receiving calls, such apparatus comprising:
   a file containing a file identifier and a plurality of contact addresses within a Session Initiation Protocol (SIP) presence server where each contact address identifies a communication port through which the agent may be contacted under a respective communication protocol;
   means within the presence server for receiving a SIP REGISTRATION message from the agent where the SIP REGISTRATION message contains the identifier of the file, but not the file itself; and means within the presence server for simultaneously logging the agent into each communication port identified by each of the plurality of contact addresses under each of the respective communication protocols in response to the SIP REGISTRATION message.

16. The apparatus for registering the agent as in claim 15 wherein a contact address of the plurality of contact addresses further comprises an e-mail address.

17. The apparatus for registering the agent as in claim 15 wherein a contact address of the plurality of contact addresses further comprises an instant messaging address.

18. The apparatus for registering the agent as in claim 15 wherein a contact address of the plurality of contact addresses further comprises a telephone number.

19. The apparatus for registering the agent as in claim 15 wherein a contact address of the plurality of contact addresses further comprises a cellphone number.

20. The apparatus for registering the agent as in claim 15 further comprising means for automatically generating the SIP REGISTRATION message upon activation of a terminal of the agent and entry of a name of the agent and a personal identification number of the agent.

21. The apparatus for registering the agent as in claim 20 further comprising means for encoding a personal identification number into the automatically generated SIP REGISTER message.

22. The apparatus for registering the agent as in claim 20 further comprising means for encoding a context identifier into the automatically generated SIP REGISTER message.

23. The apparatus for registering the agent as in claim 22 wherein the context identifier further comprises an indication that the agent is traveling.

24. The apparatus for registering the agent as in claim 22 wherein the context identifier further comprises an indication that the agent is at work.

25. The apparatus for registering the agent as in claim 22 wherein the context identifier further comprises an indication that the agent is at home.

26. The apparatus for registering the agent as in claim 25 wherein the file further comprises a plurality of files.

27. The apparatus for registering the agent as in claim 26 wherein each file of the plurality of files further comprises a plurality of contact addresses where each contact address identifies a communication port through which the agent may be contacted under a respective communication protocol 28. The apparatus for registering the agent as in claim 27 further comprising means for matching the personal identification number of the agent with indicia of identity within each file of the plurality of files and registering the agents presence at each of the plurality of contact addresses of any matched file.

29. An apparatus for registering an agent of an automatic contact distribution system for receiving calls, such apparatus comprising:
a file containing a file identifier and a plurality of contact addresses within a Session Initiation Protocol (SIP) presence server where each contact address identifies a communication port through which the agent may be contacted under a respective communication protocol;
a SIP REGISTRATION message transferred from a terminal of the agent to the presence server;
the presence server that receives the SIP REGISTRATION message from the agent where the SIP REGISTRATION message contains the identifier of the file, but not the file itself; and a log-in processor within the presence server that simultaneously registers the agent with each communications port identified by each of the plurality of contact addresses under each of the respective communication protocols in response to the SIP REGISTRATION message.

30. The apparatus for registering the agent as in claim 29 wherein a contact address of the plurality of contact addresses further comprises an e-mail address.

31. The apparatus for registering the agent as in claim 29 wherein a contact address of the plurality of contact addresses further comprises an instant messaging address.

32. The apparatus for registering the, agent as in claim 29 wherein a contact address of the plurality of contact addresses further comprises a telephone number.

33. The apparatus for registering the agent as in claim 29 wherein a contact address of the plurality of contact addresses further comprises a cellphone number.

34. The apparatus for registering the agent as in claim 29 further comprising an agent log-in processor that automatically generates the SIP REGISTRATION message upon activation of a terminal of the agent and entry of a name of the agent.

35. The apparatus for registering the agent as in claim 34 wherein the SIP REGISTRATION message further comprising a personal identification number encoded into the automatically generated SIP REGISTER message.

36. The apparatus for registering the agent as in claim 34 wherein the SIP REGISTRATION message further comprising a context identifier encoded into the automatically generated SIP REGISTER message.

37. The apparatus for registering the agent as in claim 36 wherein the context identifier further comprises an indication that the agent is traveling.

38. The apparatus for registering the agent as in claim 36 wherein the context identifier further comprises an indication that the agent is at work.

39. The apparatus for registering the agent as in claim 36 wherein the context identifier further comprises an indication that the agent is at home.

40. The apparatus for registering the agent as in claim 39 wherein the file further comprises a plurality of files.

41. The apparatus for registering the agent as in claim 40 wherein each file of the plurality of files further comprises a plurality of contact addresses where each contact address identifies a communication port through which the agent may be contacted under a respective communication protocol 42. A method of registering an agent of an automatic contact distribution system for receiving calls, such method comprising the steps of:
the agent of the automatic contact distribution system permanently storing a plurality of portal addresses in a Session initiation Protocol (SIP) presence server where each portal address identifies a communication port through which the agent may be contacted under a respective communication protocol;
the agent sending a SIP REGISTRATION message to the presence server;
the presence server simultaneously registering the agent's presence at each of the communication ports identified by each of the plurality of portal addresses under each of the respective communication protocols in response to the SIP REGISTRATION message.

* * * * *